United States Patent
Wentzloff et al.

(10) Patent No.: US 10,200,232 B1
(45) Date of Patent: Feb. 5, 2019

(54) DIGITAL QUADRATURE TRANSMITTER WITH CLASS-B I/Q CELL SHARING

(71) Applicant: THE REGENTS OF THE UNIVERSITY OF MICHIGAN, Ann Arbor, MI (US)

(72) Inventors: David D. Wentzloff, Ann Arbor, MI (US); Hun-Seok Kim, Ann Arbor, MI (US); Avish Kosari, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 15/800,634

(22) Filed: Nov. 1, 2017

(51) Int. Cl.
*H04L 27/36* (2006.01)
*H04L 5/22* (2006.01)
*H04B 1/04* (2006.01)

(52) U.S. Cl.
CPC .............. *H04L 27/362* (2013.01); *H04L 5/22* (2013.01); *H04B 1/04* (2013.01)

(58) Field of Classification Search
CPC ......... H04L 27/362; H04L 5/22; H04L 27/04; H04L 25/03343; H04L 27/365; H04B 1/04; H03C 3/40; H03C 5/00; H03C 2200/0058; H03F 2200/336
See application file for complete search history.

(56) References Cited

U.S. PATENT DOCUMENTS

| | | | | |
|---|---|---|---|---|
| 9,800,452 B2* | 10/2017 | Lehtinen | ............... | H03D 7/1441 |
| 2006/0291589 A1* | 12/2006 | Eliezer | ...................... | H03C 3/40 375/302 |
| 2013/0003881 A1* | 1/2013 | Ingels | ................... | H04L 27/122 375/259 |
| 2013/0082756 A1* | 4/2013 | Choi | ........................ | H03C 3/38 327/164 |
| 2013/0093445 A1* | 4/2013 | Newman | ................ | G01R 13/32 324/750.3 |
| 2014/0254720 A1 | 9/2014 | Deng et al. | | |

OTHER PUBLICATIONS

Z. Deng et al "A Dual-Band Digital-WiFi 802.11a/b/g/n/ Transmitter SoC with Digital I/Q Combining and Diamond Profile Mapping for Compact Die Area and Improved Efficiency in 40 nm CMOS", 2016 IEEE International Solid-State Circuits Conference (2016).

H. Jin et al "Efficient Digital Quadrature Transmitter Based on IQ Cell Sharing" 2015 IEEE International Solid-State Circuits Conferewne (2015).

* cited by examiner

*Primary Examiner* — Sophia Vlahos
(74) *Attorney, Agent, or Firm* — Harness, Dickey & Pierce, P.L.C.

(57) ABSTRACT

A digital quadrature architecture is presented that employs switched current digital power amplifiers and uses a digital class-B input code profile in combination with non-overlapping LO signals to overcome the low efficiency problems of conventional quadrature architectures. By employing digital class-B signals, the number of I/Q cells is reduced to half and the need for extra processing of the sign bits is eliminated in the transmitters, thereby improving the efficiency.

17 Claims, 10 Drawing Sheets

DIGITAL QUADRATURE TRANSMITTER WITH CLASS-B I/Q CELL SHARING

GOVERNMENT CLAUSE

This invention was made with government support under Grant No. CNS-1422175 awarded by the National Science Foundation. The Government has certain rights in this invention.

FIELD

The present disclosure relates to a digital transmitter for low power long range applications.

BACKGROUND

There are currently several solutions being proposed for long-range connectivity to Internet of Things (IoT) devices for remote-sensing or dense urban environments. SigFox, LoRa, and Cellular providers are all deploying wireless networks for low-data rate and low-power applications. However, these technologies utilize unlicensed ISM bands or paid licensed bands where propagation losses and absorption are high. Therefore in order to achieve very long-range transmissions, they use a high uplink transmission power (>13 dBm) and high receiver sensitivity values on the order of −140 dBm. In order to mitigate these requirements, a transmission scheme is proposed that uses the unlicensed Multi-Use Radio Service (MURS) band to provide a low-power solution for wide-area coverage for the IoT. This enables communication at distances >50 km with low power radios by benefiting from the low-loss propagation characteristics at the lower frequencies.

In this disclosure, a long range digital transmitter is presented for the MURS band that is frequency and data rate agile, as a low-power solution for remote IoT connectivity in multipath rich environments. While reference is made to this particular frequency band, it is understood that the broader aspects of this disclosure apply to other frequency bands as well.

This section provides background information related to the present disclosure which is not necessarily prior art.

SUMMARY

This section provides a general summary of the disclosure, and is not a comprehensive disclosure of its full scope or all of its features.

A digital transmitter is presented with a quadrature architecture. The digital transmitter includes: a signal conditioning circuit and a digital-to-analog converter comprised of a plurality of unit cells. The signal conditioning circuit is configured to receive a pair of baseband signals in a digital form and inverts both signals in the pair of baseband signals to generate a second pair of inverted baseband signals, such that the signal conditioning circuit sets negative values in each signal in the pair of baseband signals to zero and sets negative values in each signal in the second pair of inverted baseband signals to zero. Each unit cell includes a mixing circuit and a converter circuit. Each unit cell is also configured to receive the pair of baseband signals and the second pair of inverted baseband signals from the signal conditioning circuit. In operation, the mixing circuit mixes each signal in the pair of baseband signals with one of four different clock signals and mixes each signal in the second pair of inverted baseband signal with one of four different clock signals as well as combines each of the four mixed signals in time domain to create a driving signal with a digital form, where pulses in each of the four different clock signals do not overlap in time with each other. The converter circuit is configured to receive the driving signal output by the mixing circuit and generates a signal in an analog form at an output, such that the output in each of the unit cells are coupled together at a common node.

The digital transmitter also includes a clock distribution circuit configured to receive two differential clock signals in a digital form which are phase shifted one hundred eighty degrees from each other and operates to generate four different clock signals from the two differential clock signals, such that each of the four different clock signals has a twenty-five percent duty cycle and is phase shifted with respect to each of the other three clock signals.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
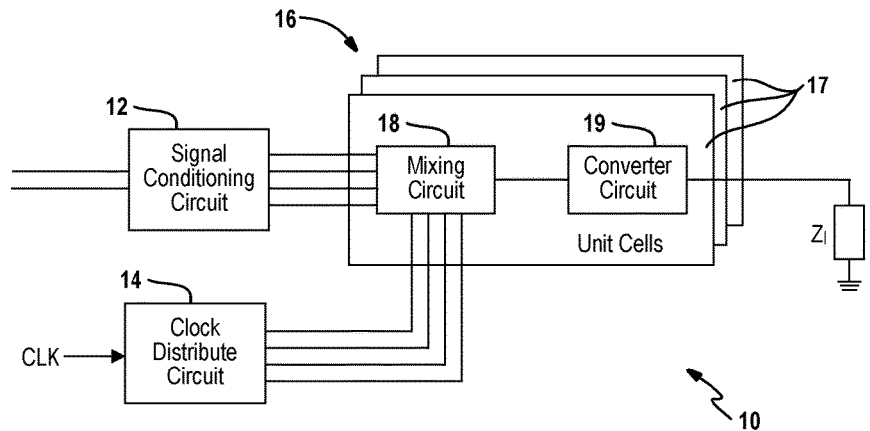
FIG. 1 is a diagram of a digital transmitter architecture.

Example embodiments will now be described more fully with reference to the accompanying drawings.

Recently the IoT wireless connectivity problem has been challenged by new types of low-data rate, long-range, technologies mainly operating in sub-GHz frequency bands referred to as low-power WANs (LPWANs). Goal of this work was to achieve a similar coverage range, while lowering the power consumption in the uplink chain and relaxing the requirements for the downlink, and therefore reducing power on the IoT device. The MURS band is an unlicensed band at 151-154 MHz that includes five narrow-band channels. MURS is similar in regulations to the Family Radio Service (FRS) band used for two-way radios. However, unlike FRS, the FCC allows data communications in the MURS band, for any use, with a limit of 2 W transmit power. Based on a link budget analysis, for a transmission range of ~60 km and a path loss exponent of 2, one only needs to transmit 0 dBm of power over a narrow bandwidth (5 kHz) and require a receiver sensitivity of −110 dBm, thereby relaxing the requirements for the uplink/downlink chains compared to other solutions. While reference is made to a particular frequency band, it is understood that the broader aspects of this disclosure apply to other frequency bands as well.

TABLE 1

MURS CONNECTIVITY COMPARISON WITH LPWAN TECHNOLOGIES

|  | SIGFOX | LoRa | Ingenu | NB-IOT | MURS |
|---|---|---|---|---|---|
| Freq. (MHz) | 868/902 | 433/868/915 | 2400 | 850/900 | 151/154 |
| Licensed | No | No | No | Yes | No |
| Modulation | UNB (DBPSK) | CSS/FSK | RPMA-DSS | OFDMA/SC-FDMA | OFDM/BPSK |
| Data rate (kb/s) | 0.1 | 0.3-37.5 | 0.01-8 | 20-250 | 5-384 |
| Coverage Range (km) | Rural: 30-50 Urban: 3-10 | Rural 10-15 Urban: 3-5 | ~15 | 10-40 | LOS: 60 |
| TX $P_{out}$ | 14 dBm | 13 dBm | 20 dBm | 23 dBm | 0 dBm |

Table 1 above shows the proposed target specifications and a comparison with other LPWAN technologies using unlicensed bands and the recent NB-IoT technology utilizing licensed bands inside an LTE carrier. In the uplink, both multi-tone and single-tone transmissions are proposed. The single-tone transmission is based on either a 10 kHz or 5 kHz bandwidth, operating at any of the five MURS frequency bands ranging from 151.82 MHz to 154.6 MHz. To reduce the peak to average power ratio (PAPR), single-tone transmission uses BPSK modulation with data-rates of 5 kb/s and 10 kb/s. For higher data-rate applications, multi-tone transmission is proposed based on 16QAM OFDM with a 10 kHz subcarrier spacing and a symbol duration of 125 μs (assuming a guard time ratio of ¼). The OFDM symbols occupy 160 kHz of bandwidth over the three lower frequency MURS channels (151.820-151.940 MHz) and the 16QAM constellation points are mapped to 16 subcarriers including 12 data, two pilot tones and two null subcarriers. The data-rate for the multi-tone transmission is 384 kb/s. This frequency planning allows realization of a low power multi-mode transmitter enabling long range transmissions for ultra-low-power IoT applications.

A number of approaches for digital transmitters have been reported in the literature, including polar, quadrature and out-phasing. There are two types of digital power amplifiers (DPA) typically used in these transmitters, one uses switched-current sources and the other type uses voltage-mode switched-capacitors (SC-DPA) for the PA cell. In current-mode, DPAs the code-dependent output impedance would introduce AM-AM and AM-PM distortion, however, an ideal peak-to-peak amplitude of $2 \times V_{DD}$ can be achieved to maximize their output power. The SC-DPAs, on the other hand, have less distortion due to their code-independent impedance but they only have a maximum swing of $V_{DD}$ at the output. For DTX architectures, recently, polar architectures have become more popular due to their higher efficiency compared to quadrature architectures. However, polar transmitters require high power consumption and high computation cost due to the use of a CORDIC block for I/Q data to polar conversion, as well as the requirement for accurate timing alignment between phase and amplitude. Therefore quadrature architectures have been studied. The conventional quadrature digital transmitters suffer from a lower output power compared to polar transmitters with the same input I/Q magnitude, due to the use of 90° phase shifted digital I/Q LO signals in their architecture. Three level LO signals have also been used to overcome the low efficiency problem for voltage-mode quadrature architectures. In current-mode, the problem is addressed by using extra I/Q sign bits and two separate DACs for I and Q paths while using the non-overlapping LO signals.

FIG. 1 depicts a digital transmitter architecture 10 for low power, long range applications. The digital transmitter architecture 10 uses a digital class-B input code profile in combination with non-overlapping LO signals to overcome the low efficiency problem of conventional quadrature architectures. By employing digital class-B input signals, the number of I/Q DACs is reduced to half and the need for extra processing of the sign bits in current-mode digital quadrature transmitters is eliminated, therefore improving the efficiency of the transmitter.

The digital transmitter architecture is comprised of a signal conditioning circuit 12, a clock distribution circuit 14 and a digital-to-analog converter 16. The signal conditioning circuit 12 is configured to receive a pair of baseband signals in a digital form. In one embodiment, the data conveyed by the pair of baseband signals is quadrature amplitude modulated (QAM). The signal conditioning circuit 12 inverts both signals in the pair of baseband signals to generate a second pair of inverted baseband signals. For each signal in the pair of baseband signals and in the second pair of inverted baseband signals, the signal conditioning circuit 12 also sets any negative values to zero. In this way, the signals have a digital class B profile. While reference is made throughout this application to quadrature amplitude modulation, it is readily understood that the broader aspects of this disclosure can be extended to other modulation schemes, such as single sideband modulation.

The clock distribution circuit 14 is configured to receive one or more driving clock signals in a digital form. From the driving clock signals, four different clock signals are generated by the clock distribution circuit 14, such that each of the four different clock signals has a twenty-five percent duty cycle and is phase shifted with respect to each of the other three clock signals. That is, pulses in each of the four different clock signal do not overlap in time with each other.

The digital-to-analog converter (DAC) 16 is comprised of a plurality of unit cells 17. Each unit cell 17 is configured to receive the pair of baseband signals and the second pair of inverted baseband signals from the signal conditioning circuit 12. Each unit cell 17 also receives four clock signals from the clock distribution circuit 14.

More specifically, each unit cell 17 includes a mixing circuit 18 and a converter circuit 19. The mixing circuit 18 mixes each signal in the pair of baseband signals with one of four different clock signals and mixes each signal in the second pair of inverted baseband signal with one of four different clock signals and then combines each of the four mixed signals in time domain to create a driving signal with a digital form. The converter circuit 19 is configured to receive the driving signal output by the mixing circuit 18 and generates a signal in an analog form at an output, such that the output in each of the unit cells are coupled together at a common node.

Figure 2:
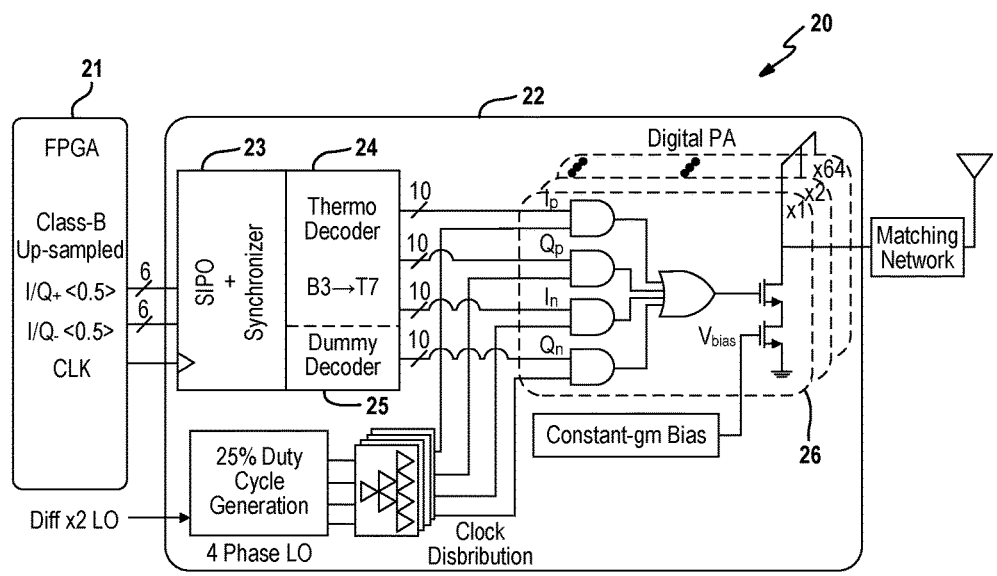
FIG. 2 is a block diagram of an example embodiment of a digital transmitter.

FIG. 2 depicts an example embodiment of a digital transmitter 20 having a quadrature architecture design in accordance with this disclosure. In this embodiment, the transmitter 20 is based on a low-IF I/Q modulation and all signal processing is performed in the digital domain, preceding the DAC. Motivated by the idea of class-B power amplifiers (PAS) and with the goal of enhancing the conventional quadrature digital transmitter efficiency, the digital baseband I/Q signals in this design are generated in two pairs of I/Q inputs, namely, $I_p/Q_p$ and $I_n/Q_n$.

Figure 3C:
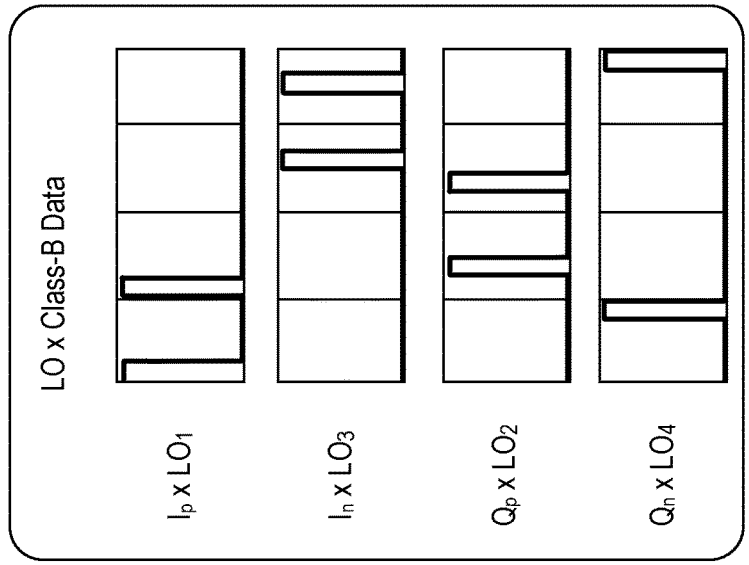
FIGS. 3A-3C are diagrams illustrating baseband signal processing by the digital transmitter.
Figure 3B:
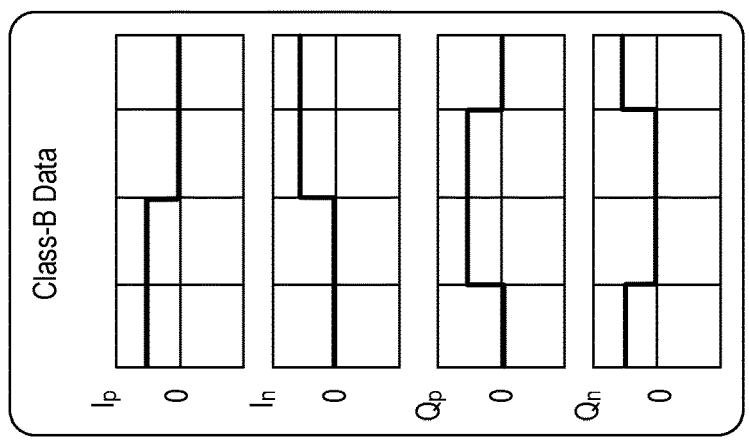
Figure 3A:
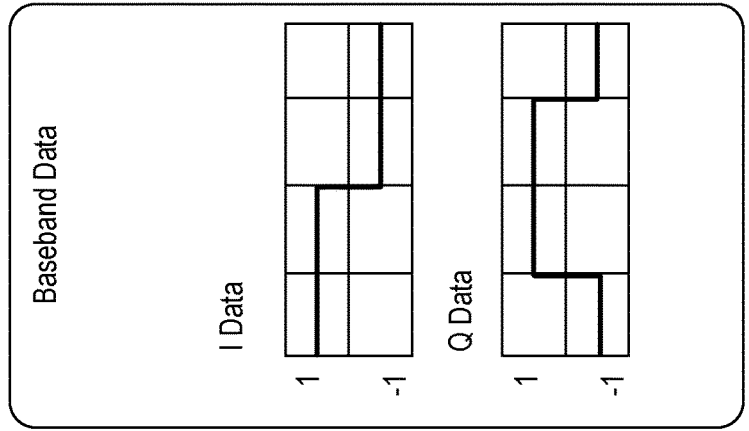
Figure 9A:
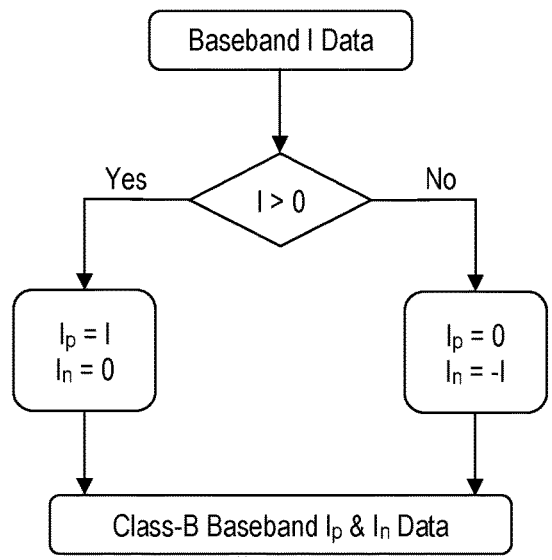
FIGS. 9A and 9B depict an example technique for generating the class-B signals for the baseband I and baseband Q data, respectively.
Figure 9B:
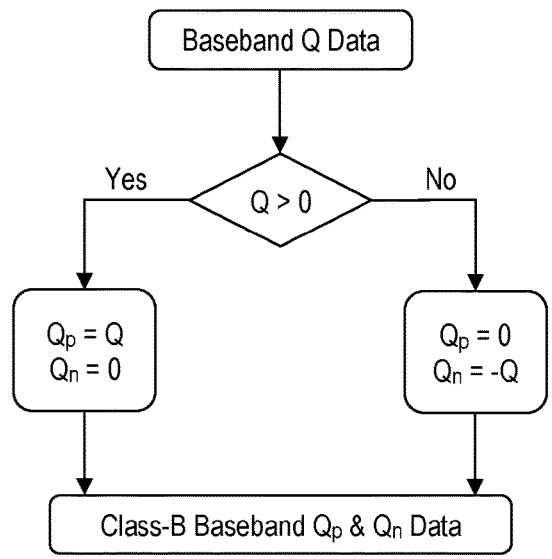

The baseband signal processing of the quadrature architecture is illustrated in FIG. 3A-3E. The digital $I_p$ and $Q_p$ data, represent the information for the positive values of baseband I and Q signals, respectively, with the negative values of those signals set to zero and similarly, $I_n$ and $Q_n$ codes contain the information for the positive values of the inverted I and Q signals with their negative values set to zero, as shown in FIGS. 3A and 3B. FIGS. 9A and 9B depict an example technique for generating the class-B signals for the baseband I and baseband Q data, respectively. Such logic can be readily implemented in the FPGA. The quadrature mixing in this design is performed in the digital domain by mixing the input I and Q data by non-overlapping 25% duty cycled LOs using combinational logic. This topology creates a high Q band pass filter for the up-converted data and also performs image rejection.

Figure 3D:
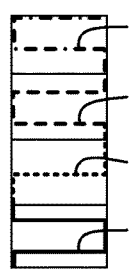
FIG. 3D is a diagram illustrating a combined up-converted I/Q signal.
Figure 3E:
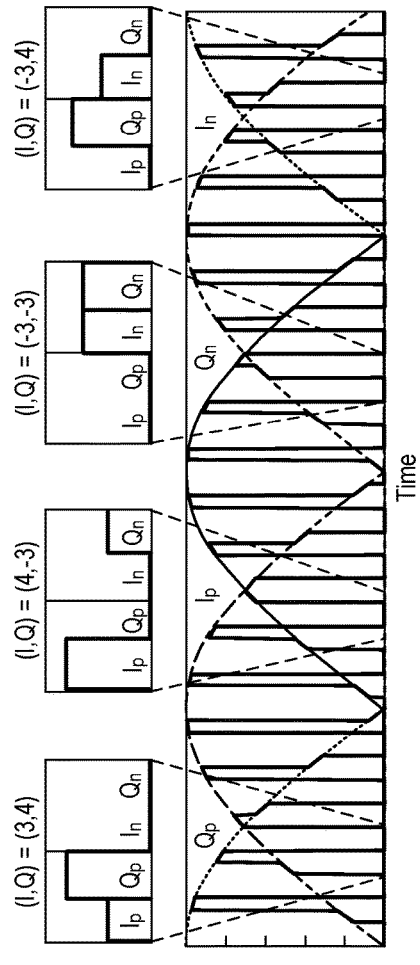
FIG. 3E is a diagram illustrating a single tone example of the I/Q combining method.

As shown in FIG. 3C, at every quarter of the carrier period each of the $I_p$, $Q_p$, $I_n$, $Q_n$ signals are multiplied by the corresponding $LO_{1-4}$ to produce the non-overlapping up-converted I/Q signals and therefore for every LO period only one of the $I_p$, $I_n$, pair or $Q_n$, $Q_p$, pair contains I/Q baseband information with the other one set to zero. The up-converted signals are then combined in the time domain to produce the digital form of the modulated MURS signal, therefore the up-converted signal cyclically interchanges between the $I_p$, $Q_p$, $I_n$, $Q_n$ values. FIG. 3D demonstrates all four types of generated I/Q waveforms in the class-B I/Q combining method. A simple example of a single tone sinusoidal I/Q input data is presented in FIG. 3E to further demonstrate the transmitters operation in baseband. Combining the digital I/Q data in the digital domain instead of summing them at the output of the DAC is possible in this design since the quadrature signals are never enabled at the same time.

By utilizing the digital class-B coding technique and non-overlapping LOs with a switched-current digital power amplifier (DPA), one is able to 1) overcome the low output power of conventional quadrature DTX and improve the power of the fundamental RF frequency by 3 dB; 2) achieve an ideal peak-to-peak amplitude of $2 \times V_{DD}$ at the output of the current-mode DPA with lower power consumption compared to uncoded I/Q inputs; 3) eliminate the need for using I/Q sign bits; and 4) eliminate two separate DACs for I and Q paths, thereby reducing the number of switch cells to half. Hence, an improved efficiency is achieved compared to a conventional quadrature DTX.

Returning to FIG. 2, the digital class-B I/Q baseband signals are generated and quantized by 6 bits on an FPGA 21. The digital I/Q baseband signals are then loaded to the chip 22 in a serial mode. In this example embodiment, the signal conditioning circuit 12 includes a serial-to-parallel converter and synchronizer 23, a thermodecoder 24 and a dummy decoder 25. The serial-to-parallel converter and synchronizer 23 aligns the data to compensate for the delay caused by the code processing. The digital baseband signals are thereafter fed to the 16× oversampling DAC at 3.2 MHz. In direct RF modulators, such as this work, the quantization noise and aliases reach the output load unfiltered but can be reduced by increasing the DAC resolution or the sampling rate. By benefiting from the relaxed spectral mask constraints in the MURS band, the selection of this sampling frequency in this design balances the timing constraints and enables a low IF implementation of the transmitter, reducing power consumption in the digital data path. This data is then segmented by a binary to thermometer decoder 24. A total of 10 bits of IF data for each of the four I/Q channels reach the direct conversion mixing DAC, among which there are 7 thermometer-coded and 3 binary bits.

In the example embodiment, the DAC 16 is implemented by a digital power amplifiers (DPAs) 26. The DPA 16 is implemented with 6 bits resolution. The higher three bits are configured in thermometer code and the lower three bits are implemented in binary. The combination of the thermometer and binary codes enables realization of higher linearity through fewer cells.

Figure 4A:
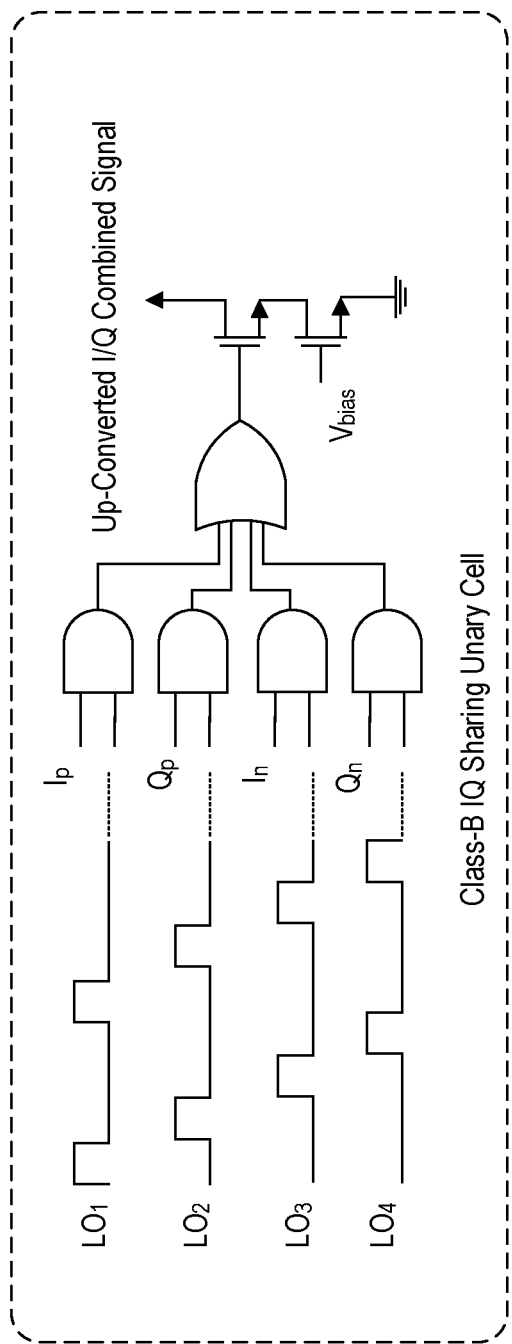
FIG. 4A is a diagram showing Class-B IQ sharing unary cell.

Referring to FIG. 4A, each unit cell consists of a digital part and an analog part. The mixing of the IF digital data and LO signals is done in the digital part using AND gates and the time division multiplexing of the up-converted signals is done using OR gates. That is, each mixing circuit is comprised of four AND gates coupled to an OR gate, such that output from each of the AND gates is an input to the OR gate.

In the analog part, the converter circuit is a current source, where the current source (i.e., transistor) is controlled by the driving signal output by the mixing circuit. For example, the converter circuit consists of an LSB size NMOS transistor, which is biased by an internal standard beta multiplier bias generator, and a cascode NMOS transistor that is controlled by the input digital data. Thus, the current source includes at least one transistor, where its control terminal is driven by the driving signal from the mixing circuit. The current source transistors are sized appropriately to maximize the output dynamic range and minimize noise. The 64 unit cells are drain-combined at a common node and connected to the output load. A matching network may be interposed between the output of the transmitter and the load.

Figure 4C:
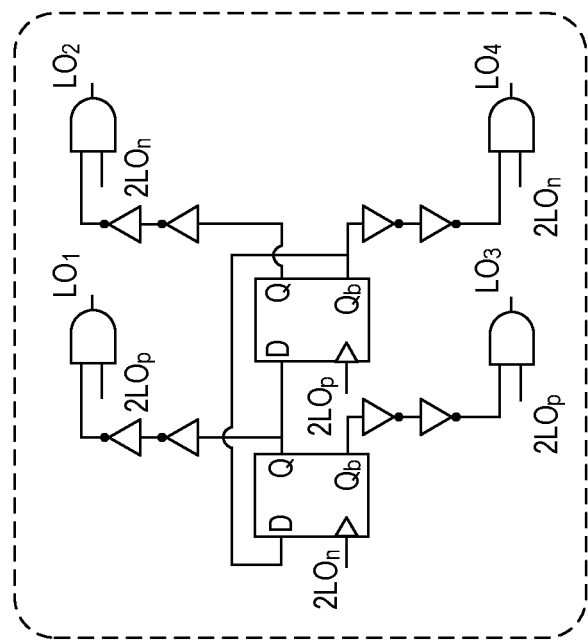
FIG. 4C is a circuit diagram of an example clock distribution circuit which generates clock signals having a twenty-five percent duty cycle.
Figure 4B:
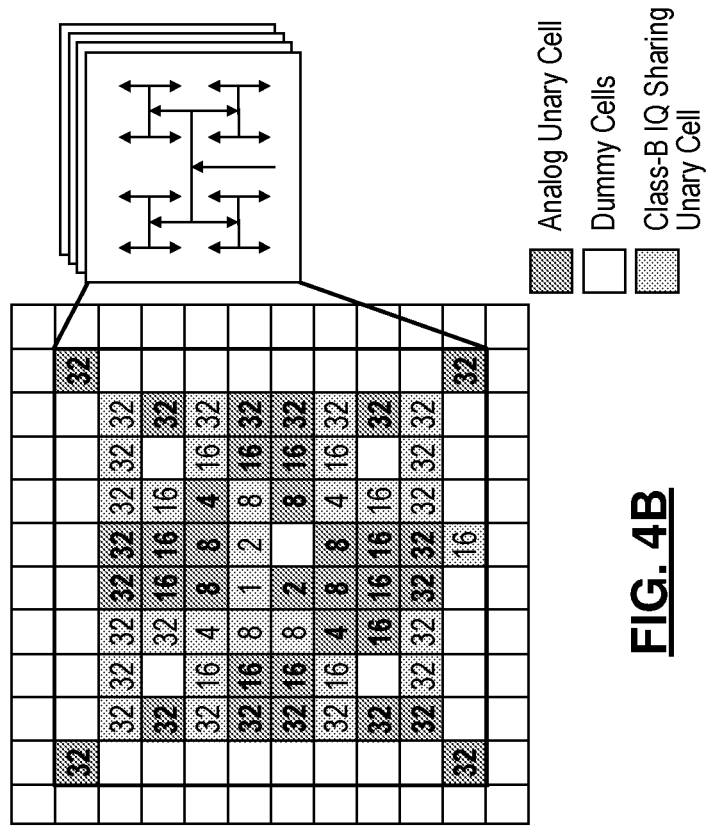
FIG. 4B is a diagram showing a floor plan of the segmented DPA.

FIG. 4B shows the floorplan of the segmented DPA and the special switching scheme proposed in this disclosure. The DAC is implemented with a common centroid layout architecture and dummy cells are added to avoid the edge effects. For linearity purposes and in order to mix the input digital signal with the LO signal with the right phase, the digital I/Q mixing and combining, the switches and the current sources are all placed in the same array. Since 64 unit current sources have to be placed in the DAC array and only 32 digital I/Q combining blocks are needed for all the unit cells, two separate types of unit cells are designed. The 32 shaded unit cells include both the analog and digital parts of the DAC, and the other 32 non-shaded unit cells only include the analog part of the DAC together with dummy I/Q combining digital blocks that are placed for the symmetry of the layout. The wiring of the 3 bit thermometer and 3 bit binary segments of all four I/Q channels is done accordingly.

FIG. 4C depicts an example embodiment for the clock distribution circuit 14. In this example, the differential 2×LO signals at twice the carrier frequency are fed from an external source to an LO generator block, which creates the 25% duty cycled LOs using two divide-by-2 circuits and combinational logic. In this design, it is important that the four 25% duty cycled LO signals are synchronized, therefore a careful 32 point custom clock routing implementation is done in the DAC layout, for example using a separate HTree clock distribution for each of the four LO signal phases to ensure a very low skew.

As proof of concept, the transmitter 10 was fabricated in a LP-65 nm CMOS process and packaged in a 5×5 mm QFN32 package. The transmitter core blocks, not including the I/O pads, occupy an area of 450×225 um$^2$. FIG. 5A shows the die photo of the transmitter. An off-chip bandpass filter suppresses the harmonics of the up-converted signal and provides the fundamental MURS band signal. To minimize the AM-AM and AM-PM distortion and increase the peak output power, the output matching network of the transmitter is designed by a parallel LC tank using a normal size inductor (22 nH) with a high output impedance at the desired MURS frequency band. This lowers the code dependent compression of the output and improves linearity.

Figure 5B:
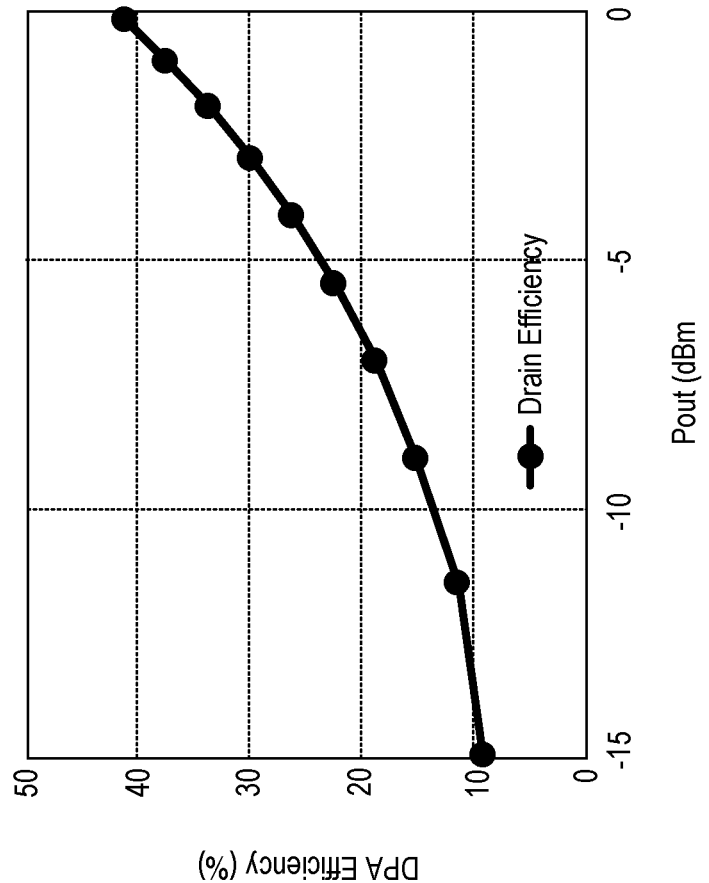
FIG. 5B is a graph showing the efficiency of the DPA in relation to the output power.
Figure 5A:
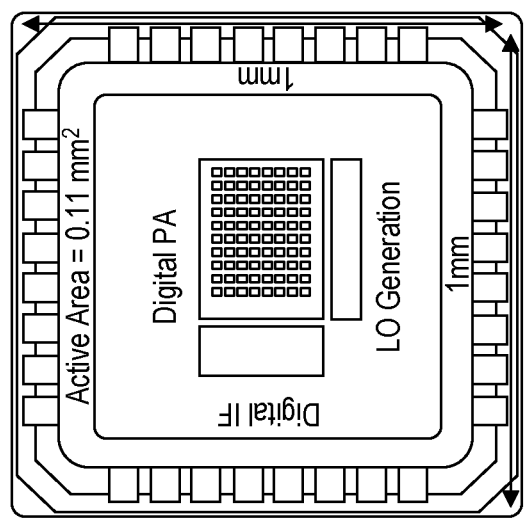
FIG. 5A illustrates a die micrograph of the transmitter.
Figure 6:
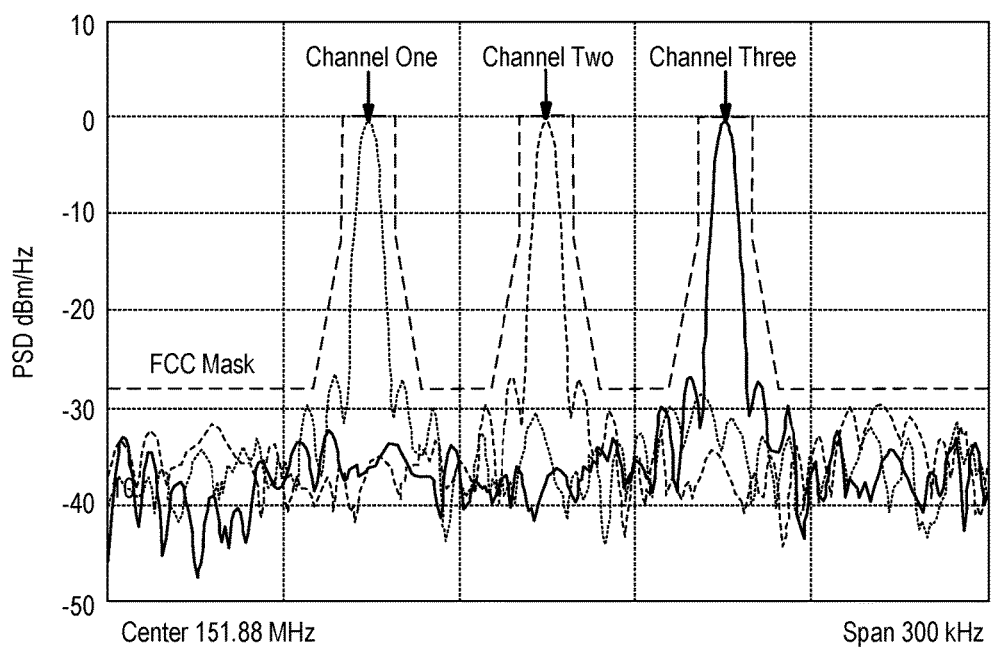
FIG. 6 is a graph showing the measured output spectrum of single-tone BPSK.

The standalone measurement results of the DPA efficiency vs. power is shown in FIG. 5B. The DPA delivers 41% of efficiency at a peak output power of 0 dBm after the matching network. The DPA and all the digital blocks in the design are operating from a 1.2V supply voltage. The transmitter is measured with MURS single-tone and multi-tone transmission schemes. The FCC mask together with the power spectral density (PSD) for the BPSK modulated single-tone transmission of the MURS three lower frequencies of 151.820, 151.880 and 151.940 MHz with a data-rate of 5 kb/s is presented in FIG. 6. It is shown that the signals are below the FC mask for the MURS band.

Figure 7A:
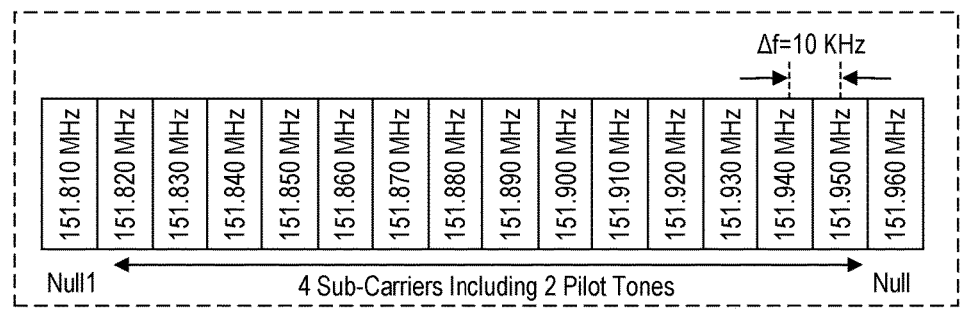
FIGS. 7A and 7B are graphs showing OFDM modulation frequency planning and measured close-in PSD of multi-tone MURS transmission, respectively.
Figure 7B:
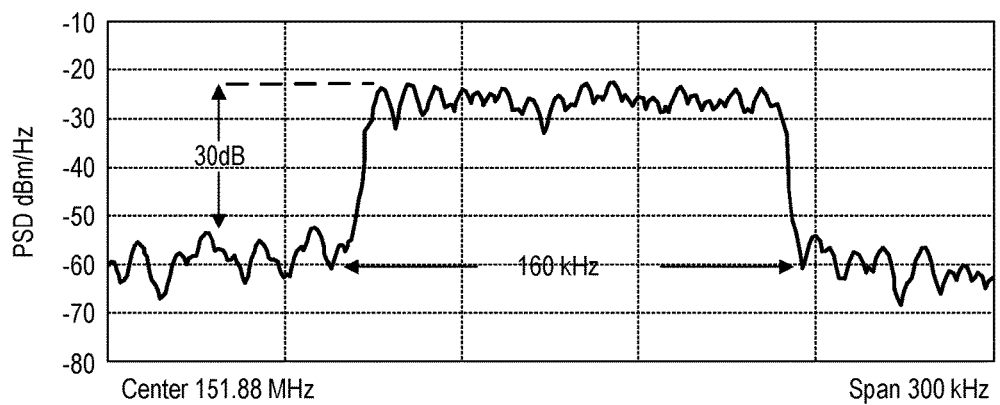

For the spectrally efficient long range communication mode, the multi-tone transmission in MURS band is measured with a 16QAM OFDM signal discussed above. The proposed OFDM frequency planning used for the multi-tone MURS transmission is presented in FIG. 7A. It achieves 384 kbps of raw data-rate over 160 kHz of bandwidth. The multi-tone transmission is not FCC compliant because it utilizes the white spaces between the MURS band channels for signal, however it is used as a proof of concept for a spectral efficient performance of the DTX over a narrow-band OFDM modulation for long-range IoT applications requiring higher data-rates. The measured close-in PSD of the 16QAM, MURS band OFDM modulation with 6.9 dB PAPR is shown in FIG. 7B, which shows an ACLR value of −30 dB at 160 kHz frequency offset for a transmit power of −7 dBm. The average efficiency of the DPA at 7 dB back-off power is 19.2%. Based on our link budget analysis for an average transmit power of −7 dBm over 160 kHz of bandwidth, a line-of-sight coverage range of 4 km is achievable assuming a path loss component of 2.

Figure 8A:
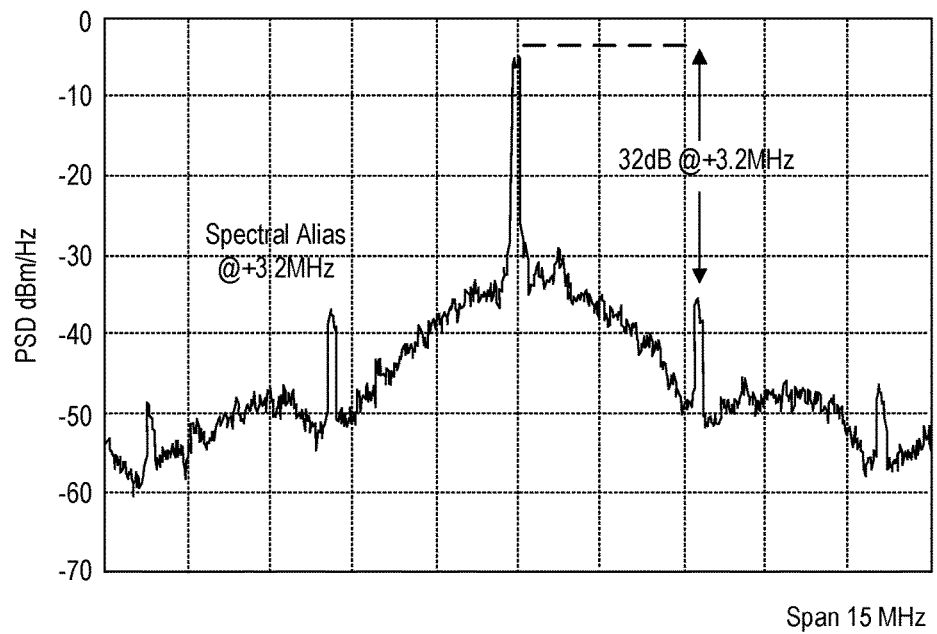
FIG. 8A is a graph showing the measured far-out PSD of multi-tone transmission.
Figure 8B:
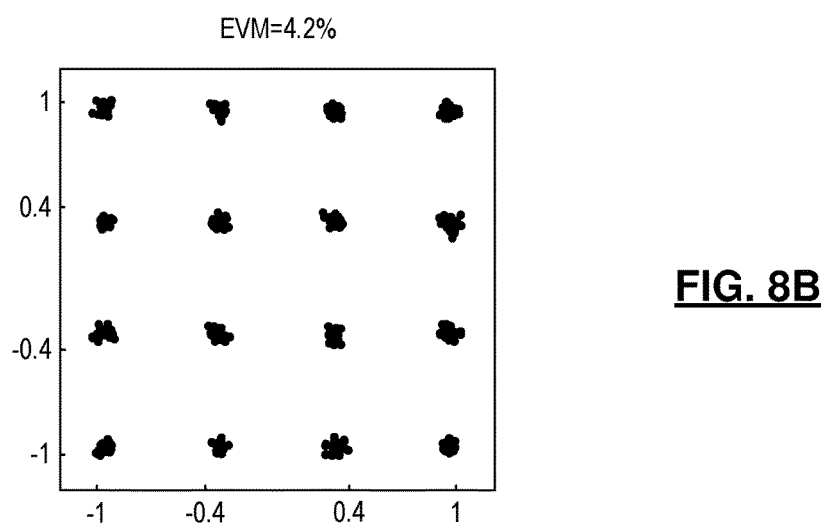
FIG. 8B is a constellation diagram of 160 kHz 16QAM symbols.

The measured far-out spectrum of 160 kHz 16QAM signal is shown in FIG. 8A and the spurs are repeated every sampling rate of 3.2 MHz. The RMS EVM performance is shown in FIG. 8B and the RMS EVM at −7 dBm output power is 4.2%. At higher output powers the DPA goes to the cut-off region out of the 6.9 dB PAPR range, and the EVM starts to degrade. Table II summarizes the measured performance of the transmitter and compares this work to the state-of-the-art narrowband transmitters.

A low power digital quadrature transmitter was presented. By utilizing the MURS frequency planning a low power solution is proposed for wide area coverage for the IoT. The transmitter efficiency is enhanced by employing the digital class-B input codeword profile in combination with the time division multiplexing of the quadrature data. The transmitter delivers a peak efficiency of 41% at a peak output power of 0 dBm. This work provides a competitive solution for emerging long range IoT applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms

TABLE II

PERFORMANCE SUMMARY AND COMPARISON WITH STATE-OF-THE-ART NARROWBAND TRANSMITTERS

| Reference | This Work | | JSCC16 | ISSCC17 | JSSC11 | RFIC14 |
|---|---|---|---|---|---|---|
| Technology | 65 nm | | 40 nm | 65 nm | 130 nm | 130 nm |
| Architecture | Digital Class-B I/Q cell sharing | | Digital Polar | Digital Polar | Analog Injection-Locked | Analog MUX/ILO |
| Carrier Freq. | 151.82–151.94 MHz | | 750–930 MHz | 850–920 MHz | 433 MHz | 2360–2480 MHz |
| Supply Voltage | 1.2 V | | 1 V | 3.3 V | 1 V | 1.5/1 V |
| Modulation | BPSK | 16 QAM OFDM | 64 QAM OFDM | UNB DBPSK | BFSK | π/4-DQPSK |
| Data-rate | 5 kb/s | 384 kb/s | — | 100 b/s | 200 kb/s | 971 kb/s |
| Peak Power | 0 dBm | | 8 dBm | 14.7 dBm | −11 dBm | — |
| Peak Efficiency | 41% | | 45% | — | 30% | — |
| Avg. Power | −7 dBm | | 0 dBm | 10 dBm | −17 dBm | −10 dBm |
| ACLR | −30 dB at 160 KHz offset | | — | — | — | −33 dB |
| EVM | 4.2% | | 4.4% | <5% | — | 3.2% |

"a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A digital transmitter having a quadrature architecture, comprising:
    a signal conditioning circuit configured to receive a pair of baseband signals in a digital form and invert both signals in the pair of baseband signals to generate a second pair of inverted baseband signals, wherein the signal conditioning circuit sets negative values in each signal in the pair of baseband signals to zero and sets negative values in each signal in the second pair of inverted baseband signals to zero; and
    a digital-to-analog converter comprised of a plurality of unit cells, each unit cell includes a mixing circuit and a converter circuit and each unit cell is configured to receive the pair of baseband signals and the second pair of inverted baseband signals from the signal conditioning circuit,
    wherein the mixing circuit mixes each signal in the pair of baseband signals with one of four different clock signals and mixes each signal in the second pair of inverted baseband signal with one of four different clock signals and combines each of the four mixed signals in time domain to create a driving signal with a digital form, where pulses in each of the four different clock signals do not overlap in time with each other;
    wherein the converter circuit is configured to receive the driving signal output by the mixing circuit and generates a signal in an analog form at an output, such that the output in each of the unit cells are coupled together at a common node.

2. The digital transmitter of claim 1 wherein data conveyed by the pair of baseband signals is one of single sideband modulated or quadrature amplitude modulated.

3. The digital transmitter of claim 1 further comprises a clock distribution circuit configured to receive a driving clock signal in a digital form and derive the four different clock signals from the driving clock signal, such that each of the four different clock signals has a twenty-five percent duty cycle and is phase shifted with respect to each of the other three clock signals.

4. The digital transmitter of claim 1 wherein the clock distribution circuit receives two differential clock signals which are phase shifted one hundred eighty degrees from each other and includes two divide-by-2 circuits, such that each divide-by-2 circuits receives one of the two differential clock signals.

5. The digital transmitter of claim 1 wherein the mixing circuit mixes each signal in the pair of baseband signals and in the second pair of inverted baseband signal with one of the four different clock signals using a set of different AND gates and combines each of the four mixed signals in time domain using an OR gate.

6. The digital transmitter of claim 1 wherein the mixing circuit is comprised of four AND gates coupled to an OR gate, such that output from each of the AND gates is input to the OR gate.

7. The digital transmitter of claim 1 wherein the converter circuit is a current source, wherein the current source is controlled by the driving signal output by the mixing circuit and the outputs of the current sources in each of the unit cells are coupled together at a common node.

8. The digital transmitter of claim 7 wherein the current source includes at least one transistor, where a control terminal of the at least one transistor is driven by the driving signal.

9. The digital transmitter of claim 1 further comprises a binary to thermometer decoder interposed between the signal conditioning circuit and the digital-to-analog converter.

10. A digital transmitter, comprising:
    a signal conditioning circuit configured to receive a pair of baseband signals in a digital form and invert both signals in the pair of baseband signals to generate a second pair of inverted baseband signals, wherein data conveyed by the pair of baseband signals is one of single sideband modulated or quadrature amplitude modulated, wherein the signal conditioning circuit sets negative values in each signal in the pair of baseband signals to zero and sets negative values in each signal in the second pair of inverted baseband signals to zero;
    a clock distribution circuit configured to receive two differential clock signals in a digital form which are phase shifted one hundred eighty degrees from each other and operates to generate four different clock signals from the two differential clock signals, such that each of the four different clock signals has a twenty-five percent duty cycle and is phase shifted with respect to each of the other three clock signals; and
    a digital-to-analog converter comprised of a plurality of unit cells, each unit cell includes a mixing circuit and a converter circuit and each unit cell is configured to receive the pair of baseband signals and the second pair of inverted baseband signals from the signal conditioning circuit,
    wherein the mixing circuit mixes each signal in the pair of baseband signals with one of four different clock signals and mixes each signal in the second pair of inverted baseband signal with one of the four different clock signals and combines each of the four mixed signals in time domain to create a driving signal with a digital form, where pulses in each of the four different clock signals do not overlap in time with each other;
    wherein the converter circuit is configured to receive the driving signal output by the mixing circuit and generates a signal in an analog form at an output, such that the output in each of the unit cells are coupled together at a common node.

11. digital transmitter of claim 10 wherein the mixing circuit mixes each signal in the pair of baseband signals and in the second pair of inverted baseband signal with one of the four different clock signals using a set of AND gates and combines each of the four mixed signals in time domain using an OR gate.

12. The digital transmitter of claim 10 wherein the mixing circuit is comprised of four AND gates coupled to an OR gate, such that output from each of the AND gates is input to the OR gate.

13. The digital transmitter of claim 10 wherein the converter circuit is a current source, wherein the current source is controlled by the driving signal output by the mixing circuit and the outputs of the current sources in each of the unit cells are coupled together at a common node.

14. The digital transmitter of claim 13 wherein the current source includes at least one transistor, where a control terminal of the at least one transistor is driven by the driving signal.

15. The digital transmitter of claim 10 further comprises a binary to thermometer decoder interposed between the signal conditioning circuit and the digital-to-analog converter.

16. The digital transmitter of claim 10 operates in a Multi-Use Radio Service frequency band.

17. The digital transmitter of claim 10 wherein the signal conditioning circuit, the clock distribution circuit and the digital-to-analog converter are implemented on the same integrated circuit.

* * * * *